United States Patent [19]
Kirk et al.

[11] Patent Number: 6,161,797
[45] Date of Patent: *Dec. 19, 2000

[54] METHOD AND APPARATUS FOR REDUCING AIRPLANE NOISE

[75] Inventors: Philip S. Kirk, Kirkland; John J. Dugan, Bellevue, both of Wash.

[73] Assignee: Dugan Air Technologies, Inc., Bellevue, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,158

[22] Filed: Nov. 25, 1996

[51] Int. Cl.⁷ .................................. B64C 3/26; B64C 3/38
[52] U.S. Cl. ............................ 244/1 N; 244/199; 244/219
[58] Field of Search .................................. 244/1 N, 199, 244/219

[56] References Cited

U.S. PATENT DOCUMENTS

| | | | |
|---|---|---|---|
| 3,174,282 | 3/1965 | Harrison | 244/1 N |
| 4,189,120 | 2/1980 | Wang | 244/219 X |
| 4,836,469 | 6/1989 | Wagenfeld | 244/1 N |
| 4,899,284 | 2/1990 | Lewis et al. | 244/219 X |
| 5,127,602 | 7/1992 | Batey et al. | 244/1 N |
| 5,407,153 | 4/1995 | Kirk et al. | 244/199 |

*Primary Examiner*—Peter M. Poon
*Assistant Examiner*—Yvonne R. Abbott
*Attorney, Agent, or Firm*—Nixon & Vanderhye P.C.

[57] ABSTRACT

A modification of a 727 airplane, including a change in wing profile, to affect flight characteristics and the engines to lessen noise, such that the takeoff and landing procedure is modified so that engine power may be reduced, permitting the modified aircraft to meet the latest noise requirements without substantially reducing pay load.

24 Claims, 14 Drawing Sheets

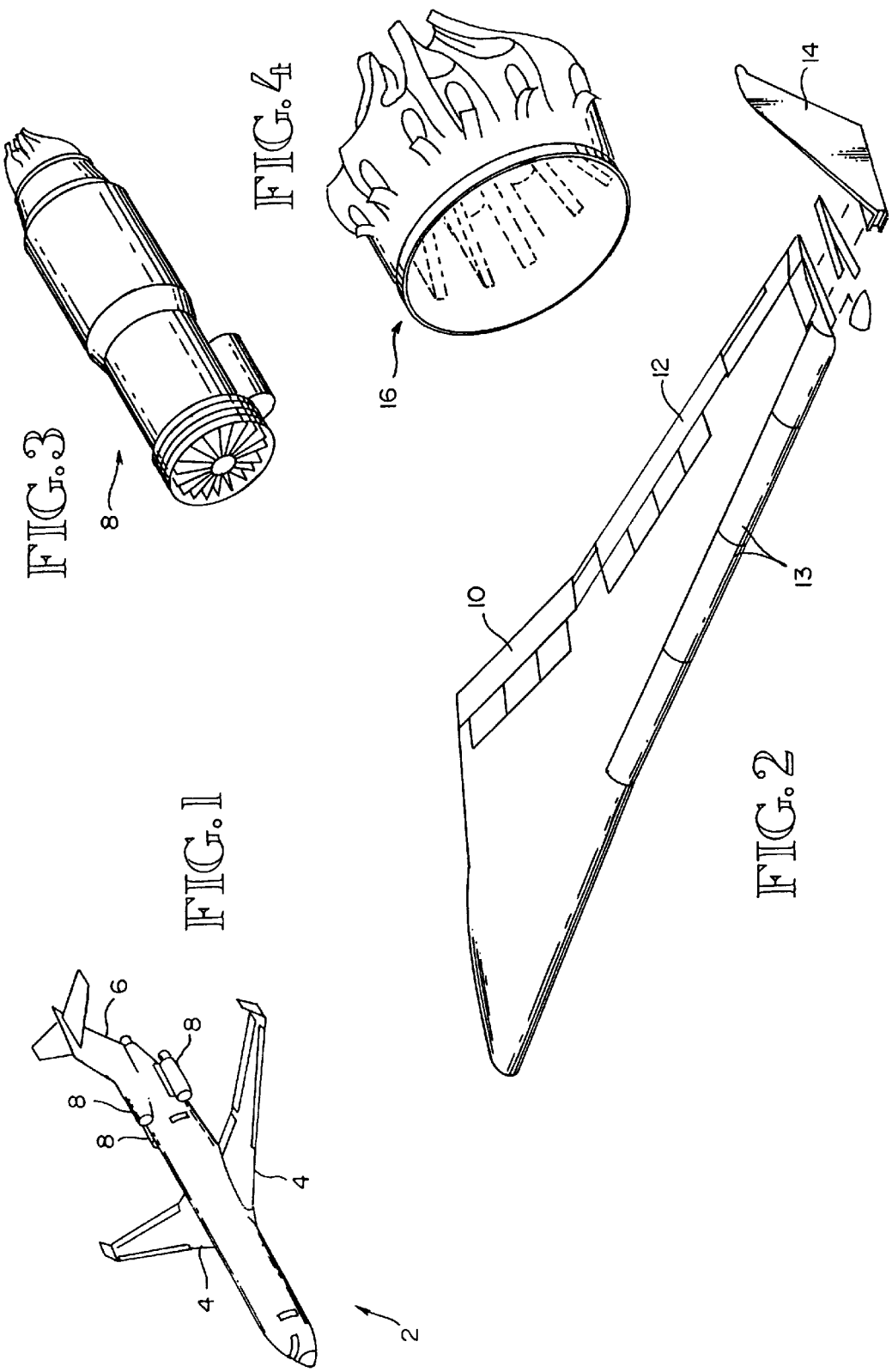

CERTIFICATION NOISE LEVELS

| CONFIGURATION | MTOW | MLW | POWER | SIDELINE * | TAKEOFF * | APPROACH * |
|---|---|---|---|---|---|---|
| Basic 727-200 | 175,000 | 142,500 | D-9 | 99.9/97.0 | 100.0/94.3 | 105.6/100.0 |
| Basic 727-200(QN) | 175,000 | 142,500 | D-15 | 102.3/97.0 | 97.0/94.3 | 100.1/100.0 |
| Basic 727-200(stage3) | 138,000 | 142,500 | <D-1 | 96.0/96.0 | 93.4/93.4 | 100.1/100.0 |
| 727-200SL | 164,000 | 142,500 | D-15 | 98.1/97.1 | 92.3/94.3 | 100.1/100.0 |
| 727-200SH | 182,500 | 142,500 | D-17 | 99.1/97.1 | 94.9/94.9 | 98.0/100.0 |

* STAGE 3 NOISE/FAR 36 LIMIT

FIG.18

METHOD AND APPARATUS FOR REDUCING AIRPLANE NOISE

TECHNICAL FIELD

This invention relates to reduction of airplane noise during takeoff and landing, and in particular, a combination of modifications of a Boeing 727 aircraft including wing modifications and engine modifications combined with flight modifications which substantially reduce the noise during takeoffs and landings of the airplane but increase the lift-to-drag ratio allowing modification of the takeoff and landing procedures without substantially impacting the load capability of the craft.

BACKGROUND ART

In an effort to satisfy complaints about aircraft noise in and around airports, the FAA has set forth noise reduction requirements. New aircraft, with the noise requirements in mind, can be designed to meet the standards, however, there is a substantial fleet of airplanes, and in particular Boeing 727 aircraft, which were manufactured prior to the requirement which do not meet the noise standards. Previous efforts known to the inventors to reduce engine noise on an airplane similar to the 727 include U.S. Pat. No. 5,127,602 which combined the structural modifications of an exhaust mixer to mix fan air with the turbine exhaust through the use of a fluted disk, along with an increased spacing between the inlet guide vanes and the inlet fan blades to generally reduce engine noise during landing. Of course, this required some modifications to the cowling.

Further, in an attempt to improve aircraft performance, the tips of the wings of the 727 were modified by adding winglets as described in U.S. Pat. No. 5,471,153. This wing tip modification in combination with altered flap and aileron positions increased the fuel mileage and decreased the drag, allowing the airplane to operate at greater, more efficient altitudes.

DISCLOSURE OF THE INVENTION

With the above-noted prior art in mind, it is an object of the present invention to combine structural modifications to a typical 727 aircraft, along with flight modifications to insure compliance with the takeoff and landing noise requirements without substantially affecting payload.

It is still a further object of the present invention to utilize the change in flight characteristics of the airplane by modifying the standard placement of the flaps and ailerons to increase the lift-to-drag ratio allowing takeoff at a greater climb angle and landing at a lower power setting, reducing the noise during these operations.

Yet a further object of the present invention is to conform the takeoff power setting to the weight of the aircraft to assure that the noise limitations are met.

BRIEF DESCRIPTION OF THE DRAWINGS

FIG. 1 is an illustration of the 727 airplane. (prior art)

FIG. 2 is an illustration of the wing tip modification. (prior art)

FIG. 3 is an illustration of the modified engine for the 727 jet airplane. (prior art)

FIG. 4 is a picture of the exhaust mixer as associated with the 727 airplane. (prior art)

Figure 5:
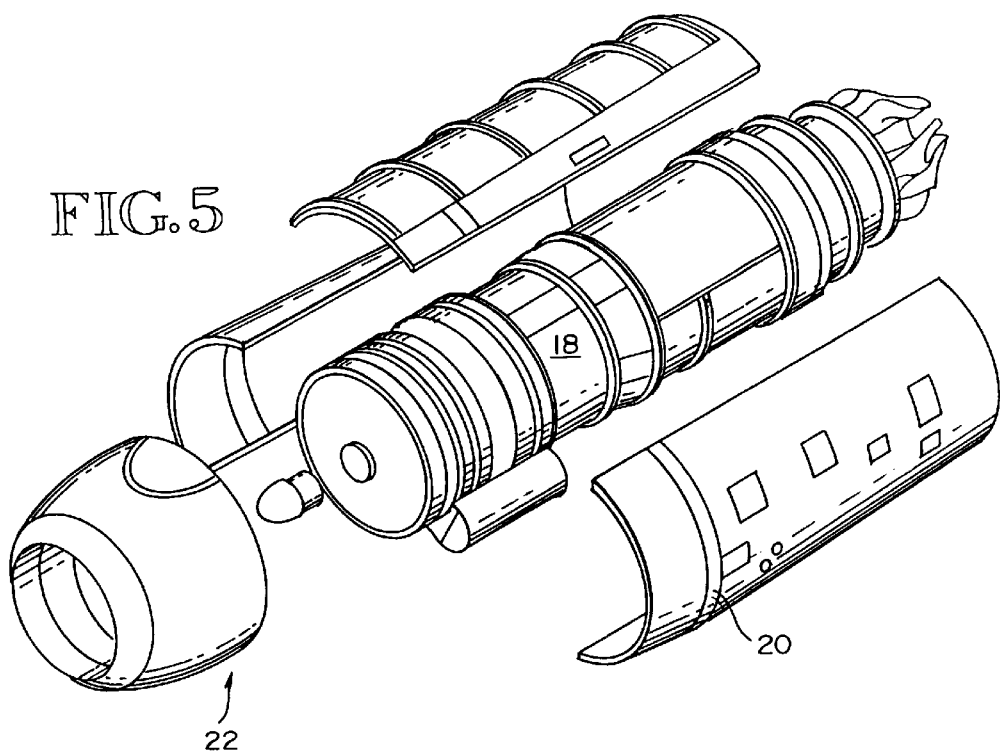
FIG. 5 is an illustration of the re-spaced guide vane kit and acoustic inlet as associated with the 727 airplane. (prior art)

Table 18 illustrates the comparative noise values for the illustrative aircraft.

BEST MODE FOR CARRYING OUT THE INVENTION

As seen in FIG. 1, the Boeing 727-type aircraft has a standard wing structure having triple engines adjacent the tail portion. The winglet modification which is used to improve the performance of the airplane includes removal of the end of the wing and replacement with a winglet, each wing tip of approximately five feet in height which is canted outwardly approximately 15° and includes a sweep of approximately 50°. In addition to the modification of the wing, the aft flap segment is deflected downwards about 7° for the inboard flap and about 3.5° for the outboard flap. The ailerons are also deflected downward 2° inboard and 1° outboard. The advantages and improved performance of this system is defined in U.S. Pat. No. 5,407,153.

It has been discovered that in addition to the high speed, high altitude performance improvements, this modification also allows the aircraft climb to be increased and also reduces the stall speed. It is these two results, greater angle of climb and lower stall speed, which are used in combination with other changes as explained hereinafter that allow the modified 727 to meet the new noise standards for takeoff and landing without reducing the payload.

It is further to be understood that stall protection may be modified through further alteration of the wing profile by a repositioning of the leading edge slat.

The leading edge slats on the basic 727 are a two position device, fully retracted and fully extended to approximately sixty degrees. For all flap settings from two degrees to forty degrees the slats are deflected to their fully deflected position. This large deflection provides adequate stall protection of the leading edge at all flap settings up to the maximum of forty degrees.

In addition to providing stall protection, the slats also induce substantial drag increases at lower flap settings.

Therefore, at the acoustic takeoff flap of five degrees, there is a significant drag penalty, and corresponding penalty in climb performance. This in turn results in higher takeoff noise both due to reduced altitude at the measuring station, and also a higher power setting.

The modification of the leading edge slat actuation system allows the selection of a reduced deflection of thirty degrees for the low flap settings, and in particular at the acoustic flap setting. The result is improved climb performance and a further reduction in noise at the measuring station.

As seen in FIG. 1, the aircraft is generally designated at 2 having a pair of opposing wings 4, tail 6 and a cluster of three engines 8 adjacent the tail.

As seen in FIG. 2, the wing 4 has an inboard flap 10, an outboard flap 12 and leading edge slats 13, and, as seen in this view, the winglet 14 extends outwardly and upwardly from the end of the wing. The attachment for the winglet is further described in the previously issued patent and will not be described in detail herein.

FIG. 3 depicts one of the outboard engines 8, including the modifications described in greater detail hereinafter.

Reference is now had to FIG. 4 wherein one of the modifications, i.e., the engine exhaust mixer can be seen as a change to the engine 8 and comprises a fluted disk system element 16, as fully described in U.S. Pat. 5,127,602 is placed aft of the turbine and mixes fan air with exhaust jet turbulence reducing the overall noise effect.

FIG. 5 illustrates another structural modification which involves the placement of a spacing ring 18 between the inlet guide vanes and the inlet fan blades. This of course involves a cowling modification as at 20, and further includes a modification of the front of the cowling 22 as well.

Figure 6:
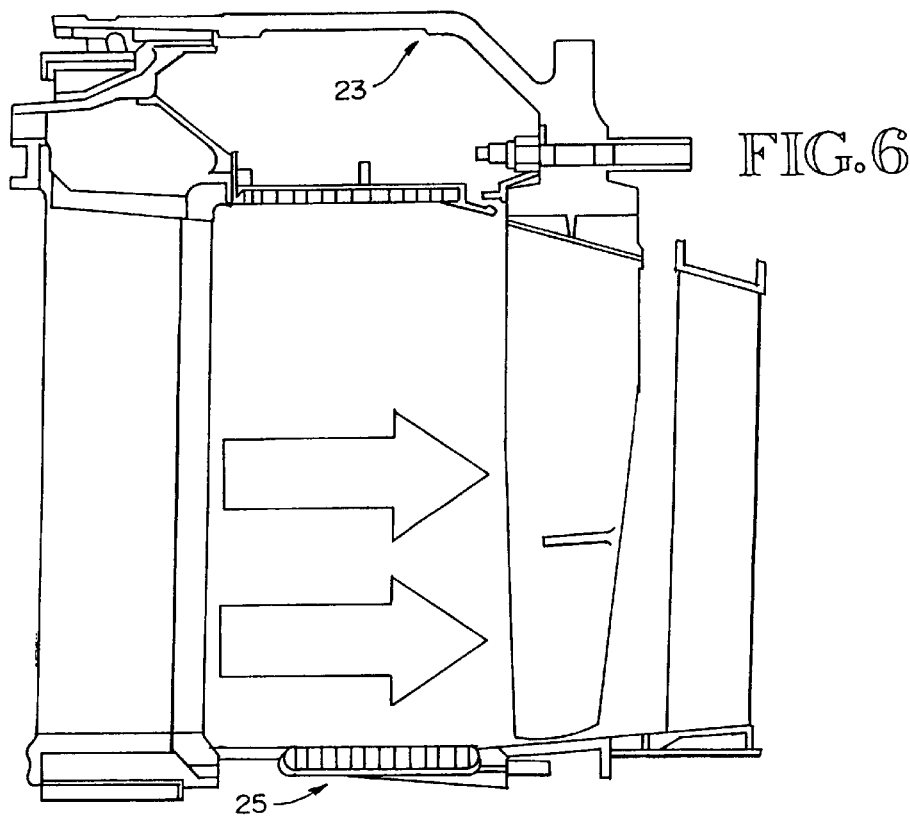
FIG. 6 is an enlarge illustration of the re-spaced guide vane as proposed. (prior art)

As seen in FIG. 6, the distance between the inlet guide vanes and the inlet fan blades is achieved through an extended fan hub 23 and an added ring 25 in the cowling.

Figure 7:
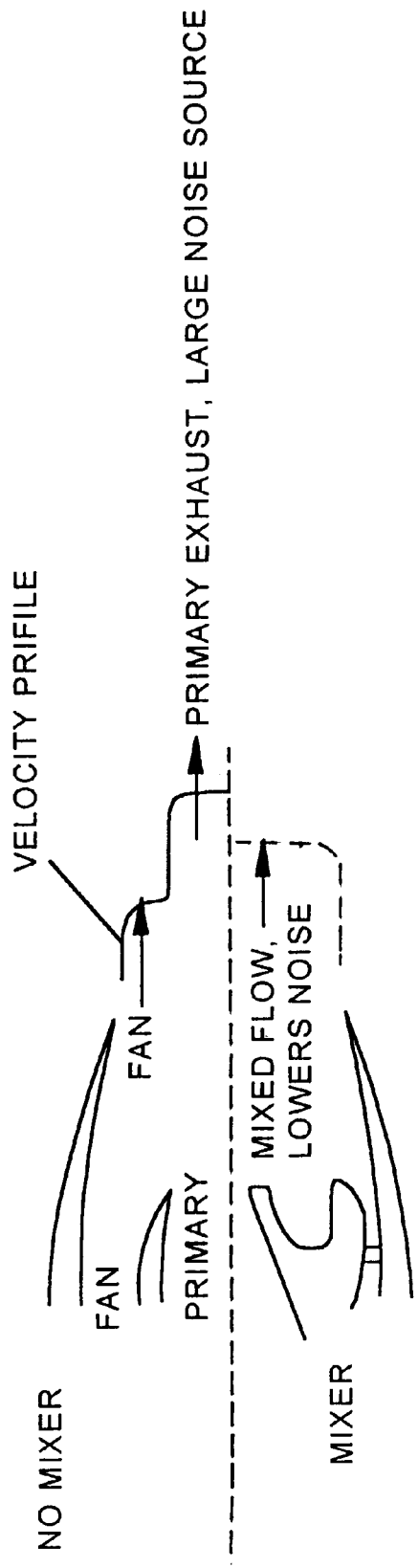
FIG. 7 is a schematic illustrating the noise profile of the engine exhaust with and without the exhaust mixer. (prior art)

FIG. 7 is a schematic demonstrating the reduced velocity profile by the addition of the mixer, resulting in lower noise.

Figure 8:
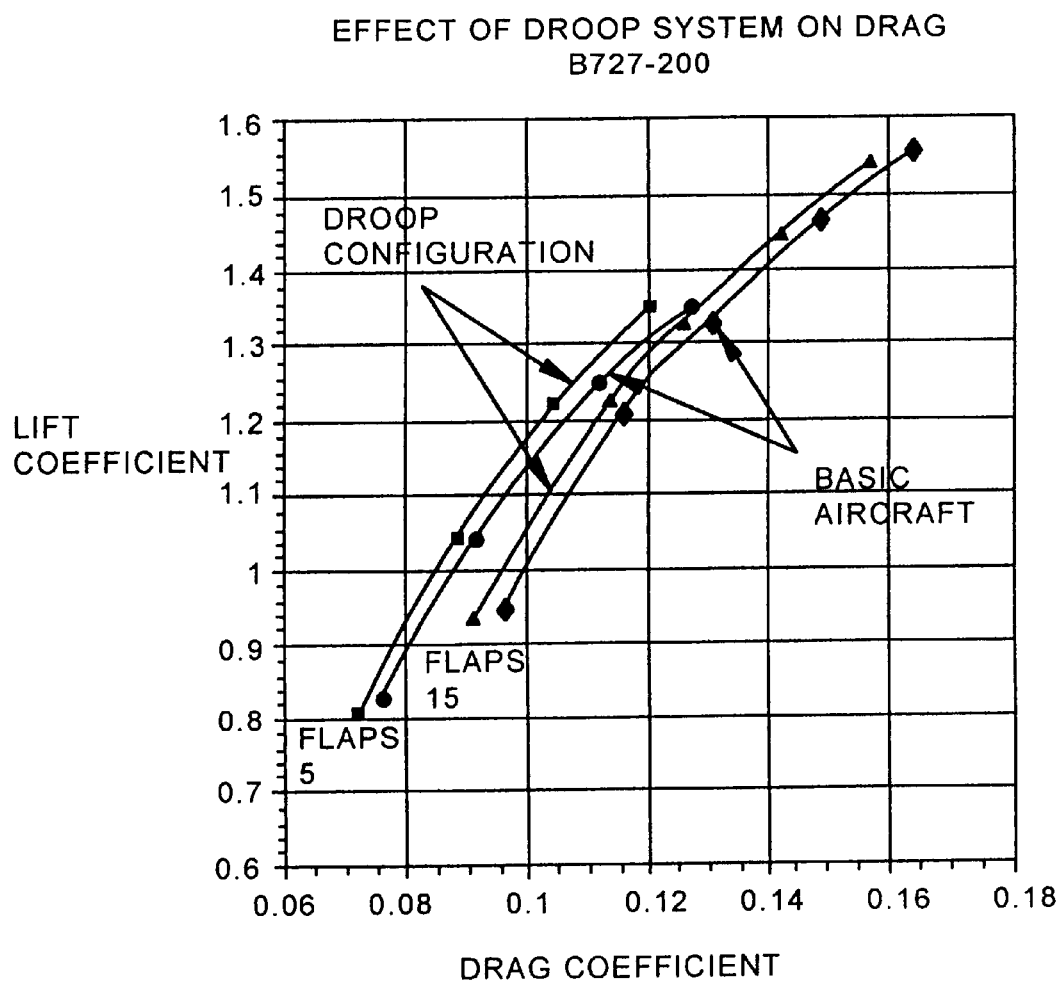
FIG. 8 is a graph depicting the affect of the droop configuration associated with the wing tip modification.

As noted hereinabove, the winglet system results in aerodynamic changes to the aircraft, including improvements in high speed performance, but in addition to these high speed performance improvements, there were alterations in the low speed characteristics of the aircraft. The lift-to-drag ratio of the aircraft is increased not only for the flaps-up configuration but also for all other flap settings as shown in FIG. 8. This performance change allows the climb-out angle to be increased and thus simultaneously increases the altitude above the noise measuring station for takeoff noise. In addition, the increased lift-to-drag ratio requires less engine power to the point where the takeoff noise is measured which in turn reduces noise at the measuring station.

Figure 9:
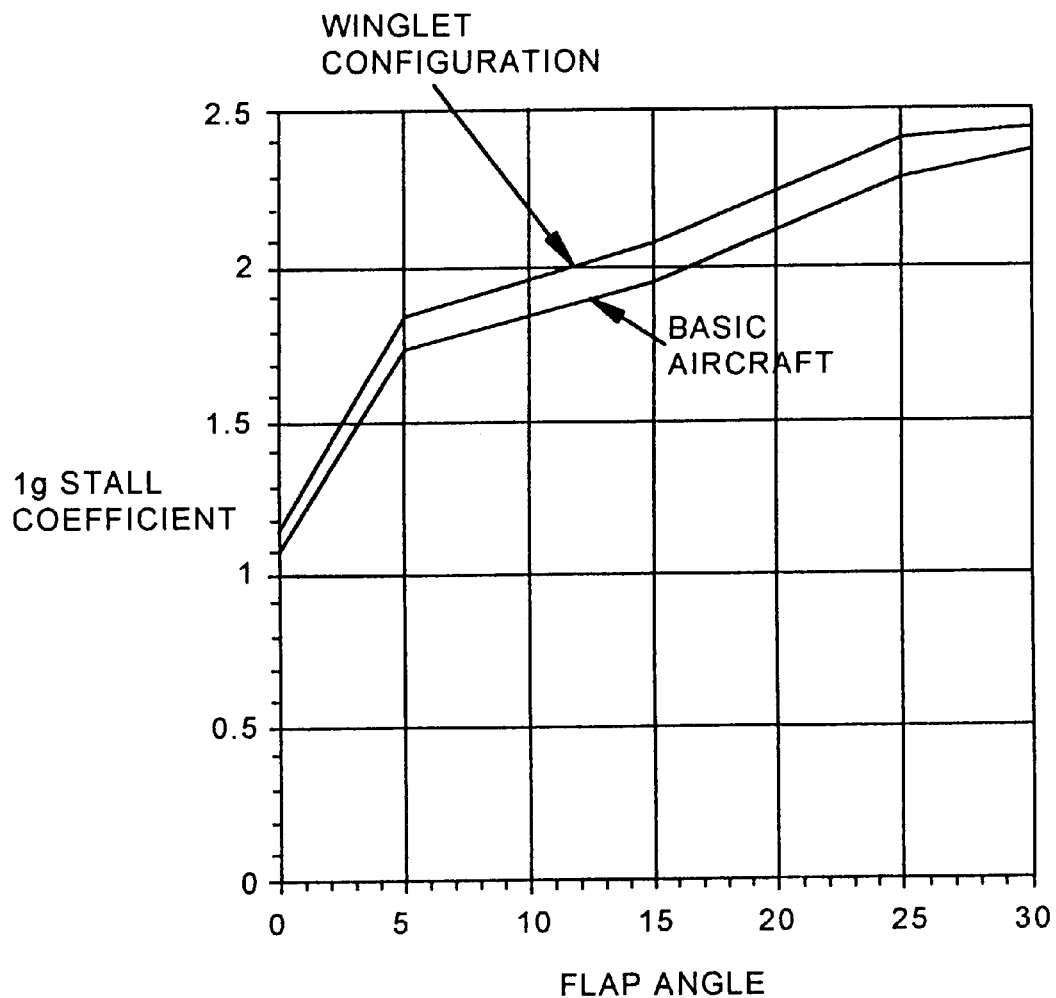
FIG. 9 is a graph depicting the stall lift co-efficient as affected by the winglet configuration.

As illustrated in FIG. 9, the second effect of the winglet system is to reduce stall speed. This in and of itself has no significant effect on the airplane noise, however, this characteristic can be utilized to permit a slightly lower flap setting without changing takeoff speeds.

Figure 10:
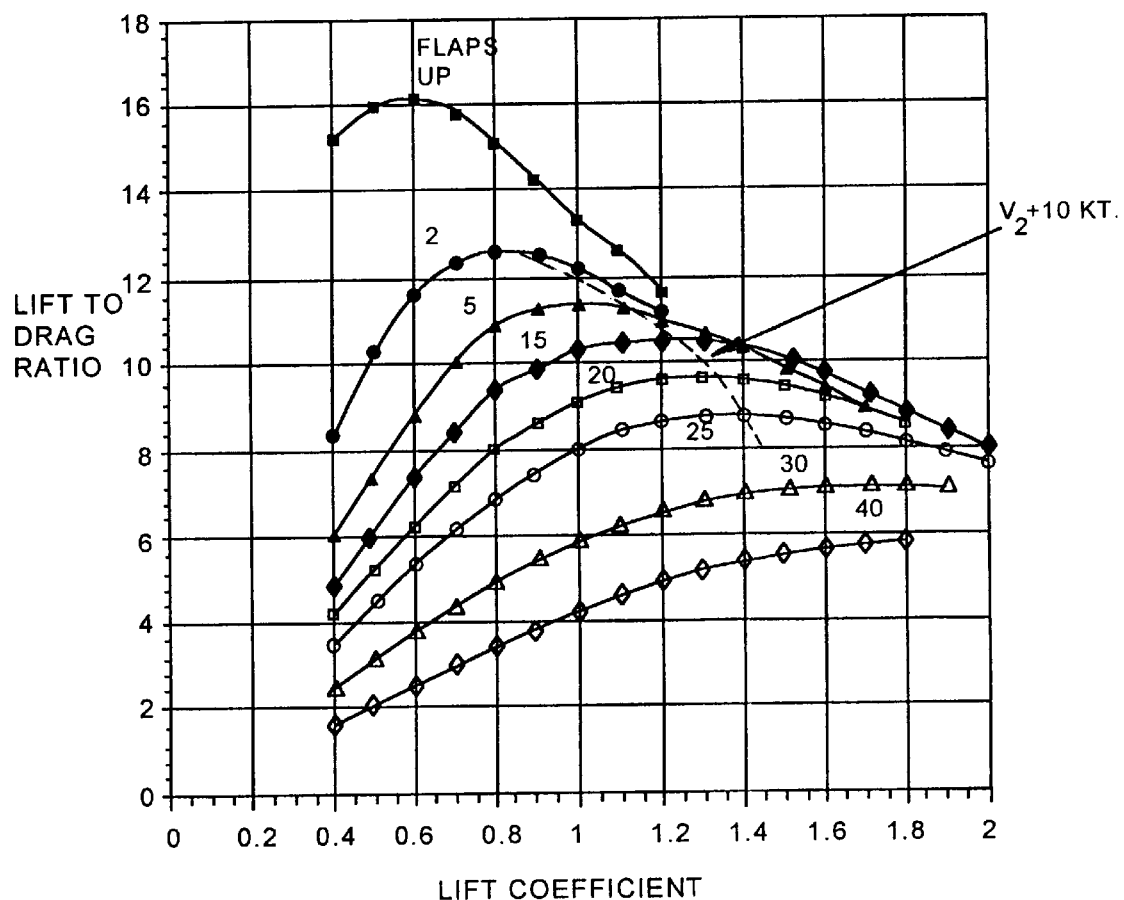
FIG. 10 is a graphical illustration of the lift-to-drag ratio for a standard 727 aircraft.

FIG. 10 shows the lift-to-drag ratio along with the airplane lift co-efficient for various flap settings from 2° to 25°. It can be seen that as the flap setting is reduced, the maximum lift-to-drag ratio increases. The operational restrictions imposed by the FAA regulations (FAR Part 36) has been indicated on the curve corresponding to the V2+10K speeds. The point of intersection of the V2+10K curve, with the previously plotted curves creates an operational envelope.

Figure 11:
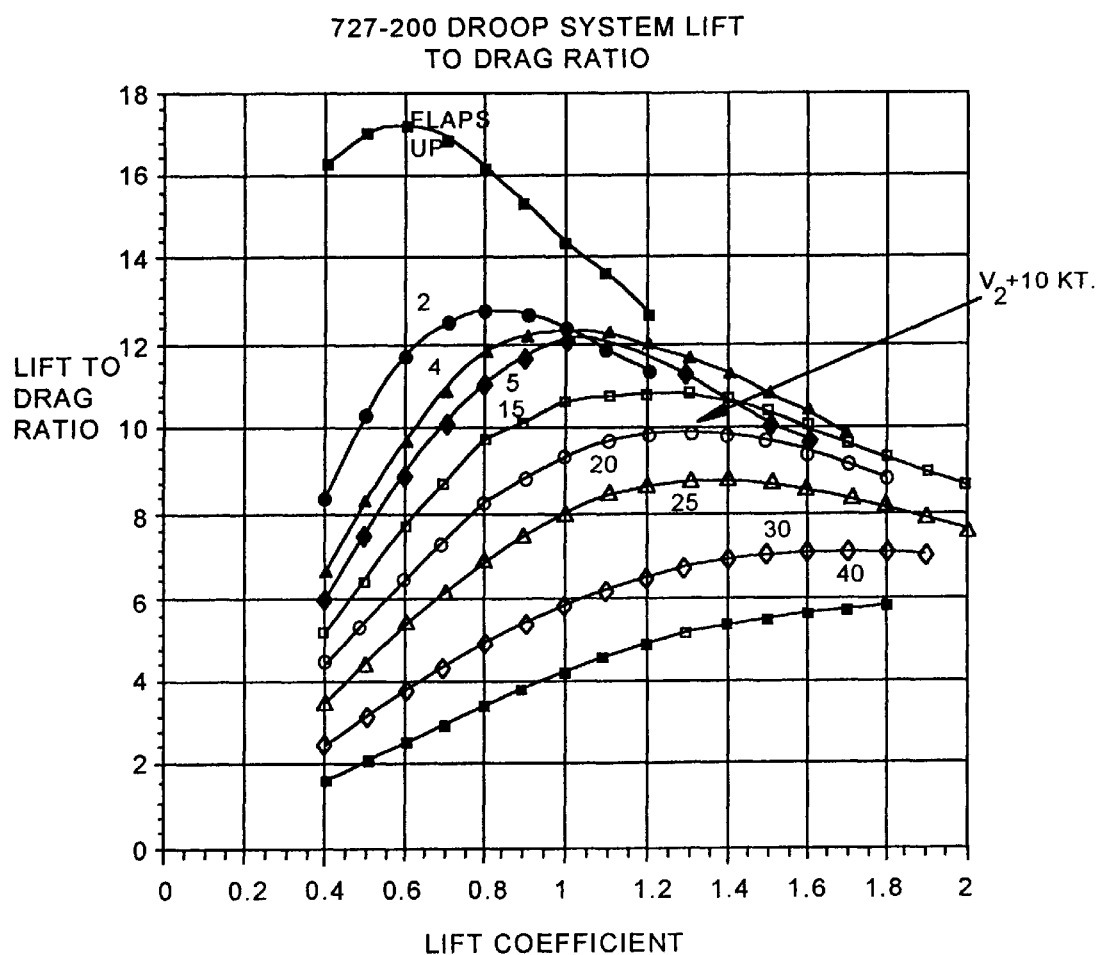
FIG. 11 is a lift-to-drag ratio comparison for a plane utilizing the group system at various flap settings.

Comparing FIG. 10 with FIG. 11 which is identical to FIG. 10, however, using the modified configuration, it can be seen that for any particular operational lift co-efficient, the lift-to-drag ratio goes up first because of the basic increase of all flap settings, but secondly due to the reduced stall speeds that allow a lower flap setting for the same operational speed. It can now be deduced from FIG. 11 that the lift-to-drag ratio for the intermediate flaps 4 has its peak almost at the operational line for V2+10KT. The increase in lift-to-drag ratio over the basic aircraft as currently certified in the modified aircraft as proposed herein with the slightly lower takeoff flap is approximately 8%. The noise at the takeoff measuring station is reduced both due to the higher altitude and the lower power setting resulting from the higher lift-to-drag ratio.

Sideline noise which is also measured as a part of the FAA requirements is not significantly affected by the performance of the aircraft, but is dominated by the choice of takeoff power settings in combination with the extent of turbine exhaust gas mixing. Thus two features of the engine modification are used to reduce this noise. First, the takeoff power setting can be reduced to achieve the same performance as the unmodified aircraft through the altered flap setting. Even further reduction can be achieved if performance is degraded. Secondly, the installation of an exhaust mixer increases the gaseous mixing and reduces the noise. Similarly to the takeoff condition, the improved aerodynamics results in an increased lift-to-drag ratio allowing the approach flap setting to be reduced and maintain the same stall speeds as the basic aircraft. The combination of these effects is to lower the approach power setting and the corresponding approach noise.

A change in the inlet guide vane spacing results in a yet further reduction in the approach noise.

Figure 12:
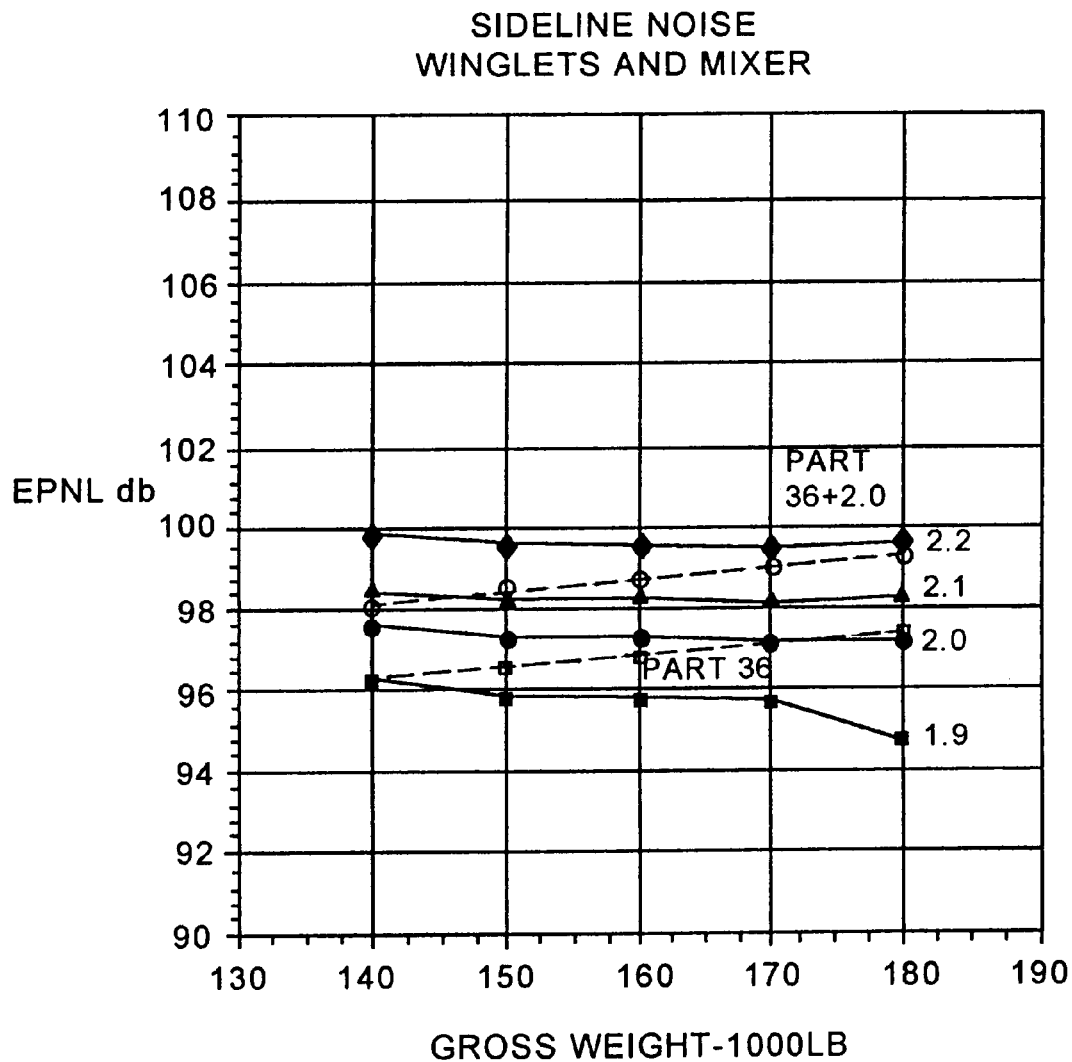
FIG. 12 is a graphical illustration of the takeoff and sideline noise as a function of the weight and power setting.
Figure 13:
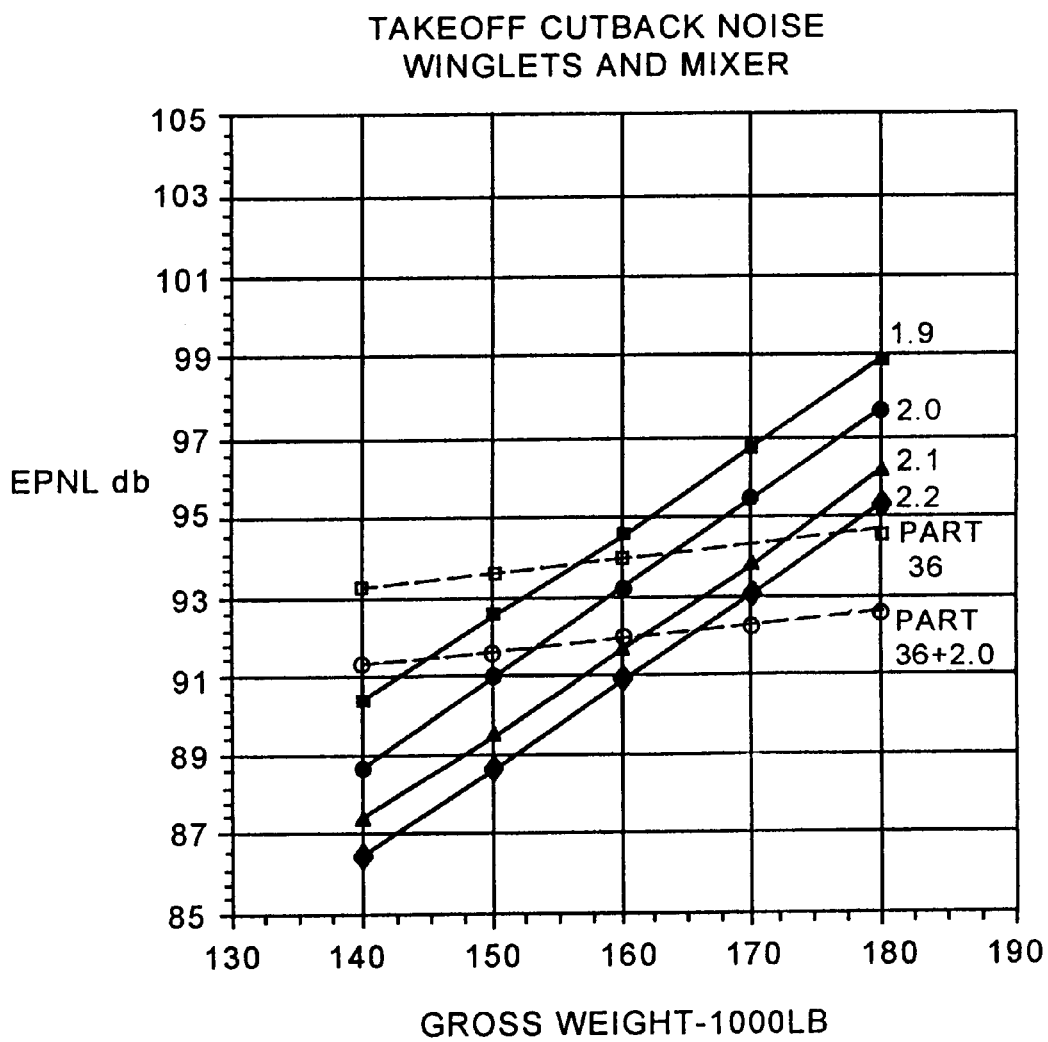
FIG. 13 is a figure similar to 8 showing the takeoff cutback noise.
Figure 14:
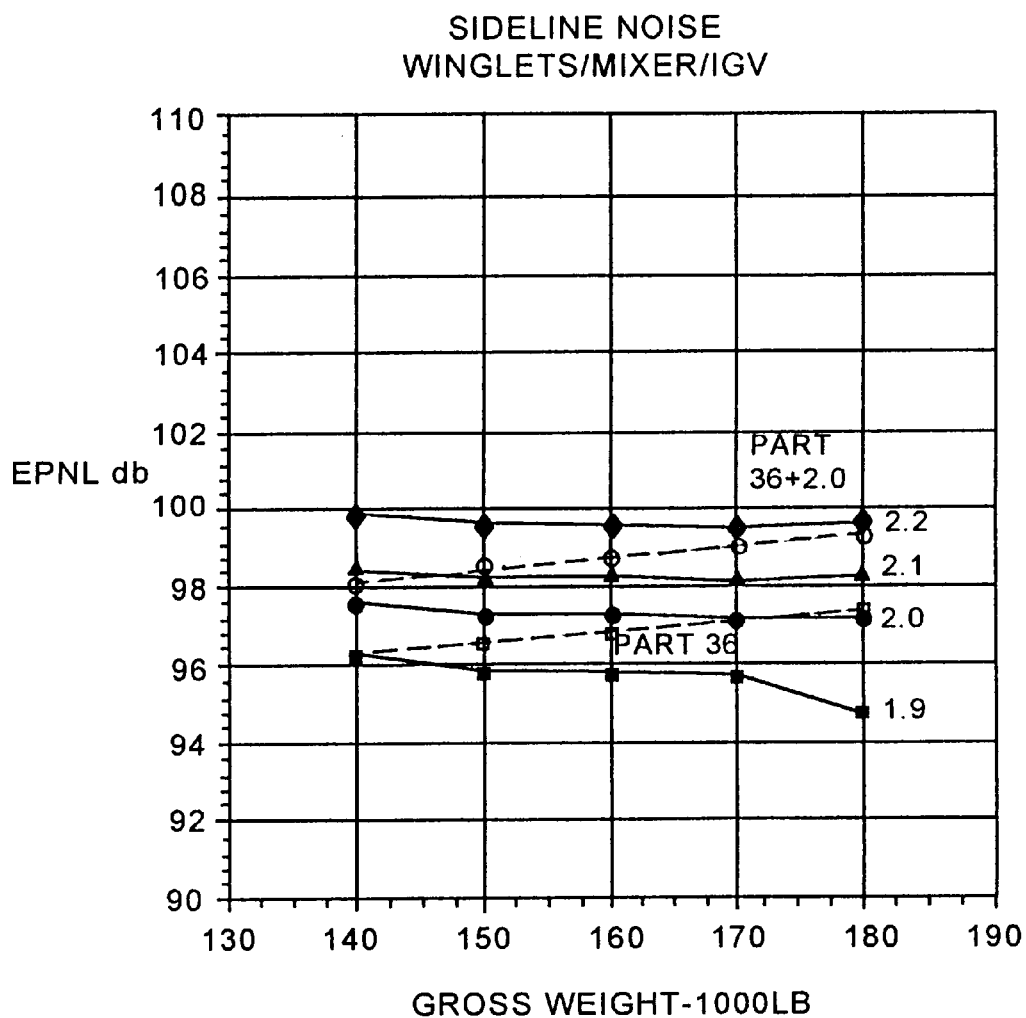
FIG. 14 is the illustration of the sideline noise with the combination of the various structural components.
Figure 15:
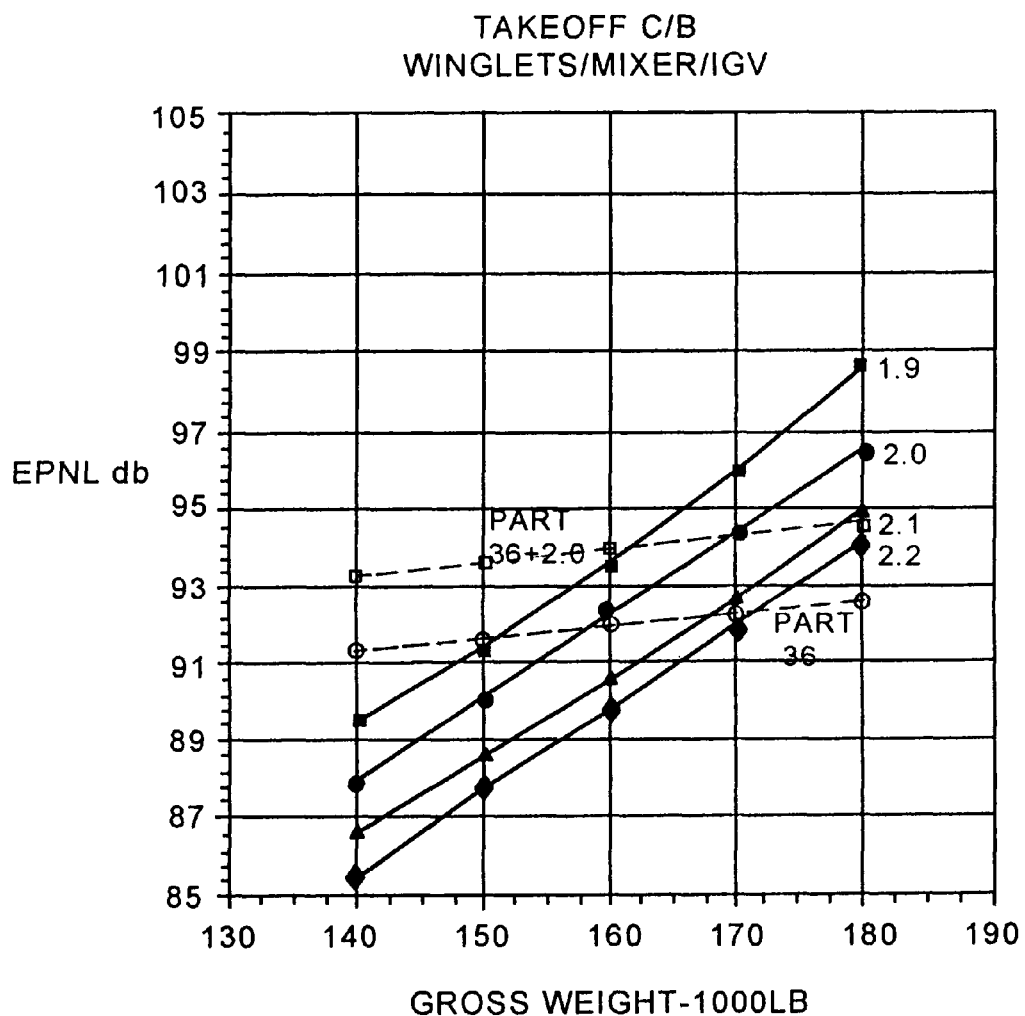
FIG. 15 is an illustration with the takeoff noise utilizing the various structural components at various takeoff settings.

Each of the changes described hereinabove results in a reduction of one or other components of the measured noise. However, to meet compliance with the Stage 3 regulations, the correct combination of weight and takeoff power setting must be chosen. This is accomplished by considering the takeoff and sideline components of noise as a function of the weight and power settings as shown in FIGS. 12 and 13. These charts show the respective noise component plotted against the weight for several takeoff power settings for the modified low weight configuration. It is to be noted that as the takeoff power setting increases, so also does the sideline noise, but this measured noise of takeoff is reduced because of the higher altitude of the craft at the noise measuring station. Shown on both the plots are the requirements for the Stage 3 compliance which increase with weight. The intersection of each takeoff or sideline noise line with the corresponding compliance line represents a particular combination of weight and power setting that satisfies the regulations. FIGS. 14 and 15 depict the same information for the heavy configuration.

Figure 16:
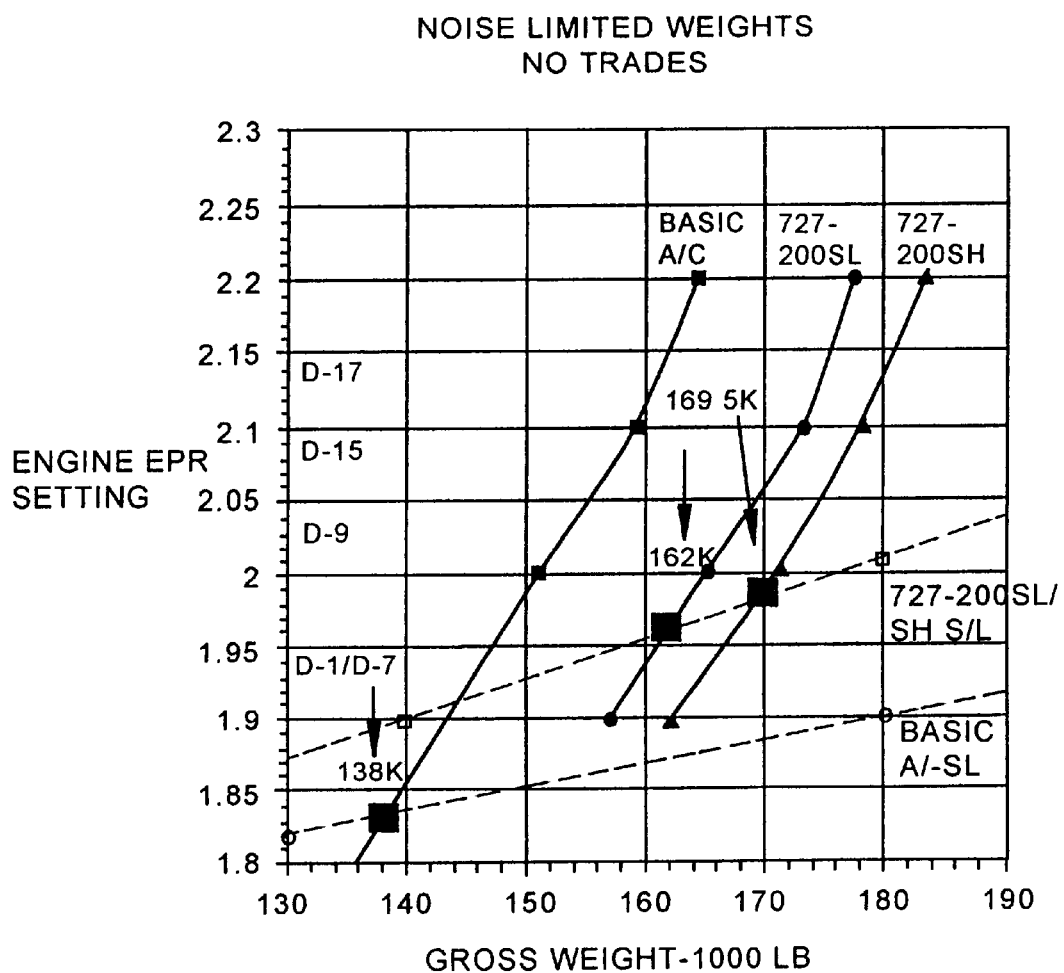
FIG. 16 is an illustration of the noise limited weights comparing the basic aircraft and the two modified aircraft, light and heavy.

FIG. 16 now shows a plot of each of the previous intersection points versus weight for both takeoff and sideline noise. The intersection of these two lines represents a choice of weight and power setting that satisfies both the takeoff and sideline Stage 3 requirements.

The above procedure has been conducted for full compliance with takeoff and sideline requirements, however, the regulations allow any measurement to exceed the required limit by up to 2EPNdb provided that another noise value is lower than that excedence by at least the same amount and not exceeding 2.0EPNdb. This shifting of the noise limits is known as "noise trading".

The noise trade procedure results in a link between all three noise values. In addition to the obvious link between takeoff and sideline noise, the approach noise becomes linked to both these noise components via the trade mechanism. The basic aircraft as shown in the graphs has no available approach noise trade at the lowest approach flap setting of 30°. However, when the benefits of the winglet system are utilized, the approach lift-to-drag ratio is increased by both the inherent improvement in aerodynamics, but also, since the approach flap angle can be reduced slightly, still maintains the same operational speeds. Consequently, the approach power setting is reduced, a noise surplus is available for trade to takeoff and/or sideline noise. The alternate configuration as proposed in the present application with the increased guide vane spacing, the approach noise is reduced further by the lower inlet noise. This permits a greater trade to takeoff or sideline noise resulting in an increase in the maximum allowable weight at which the aircraft can meet the requirements.

Figure 17:
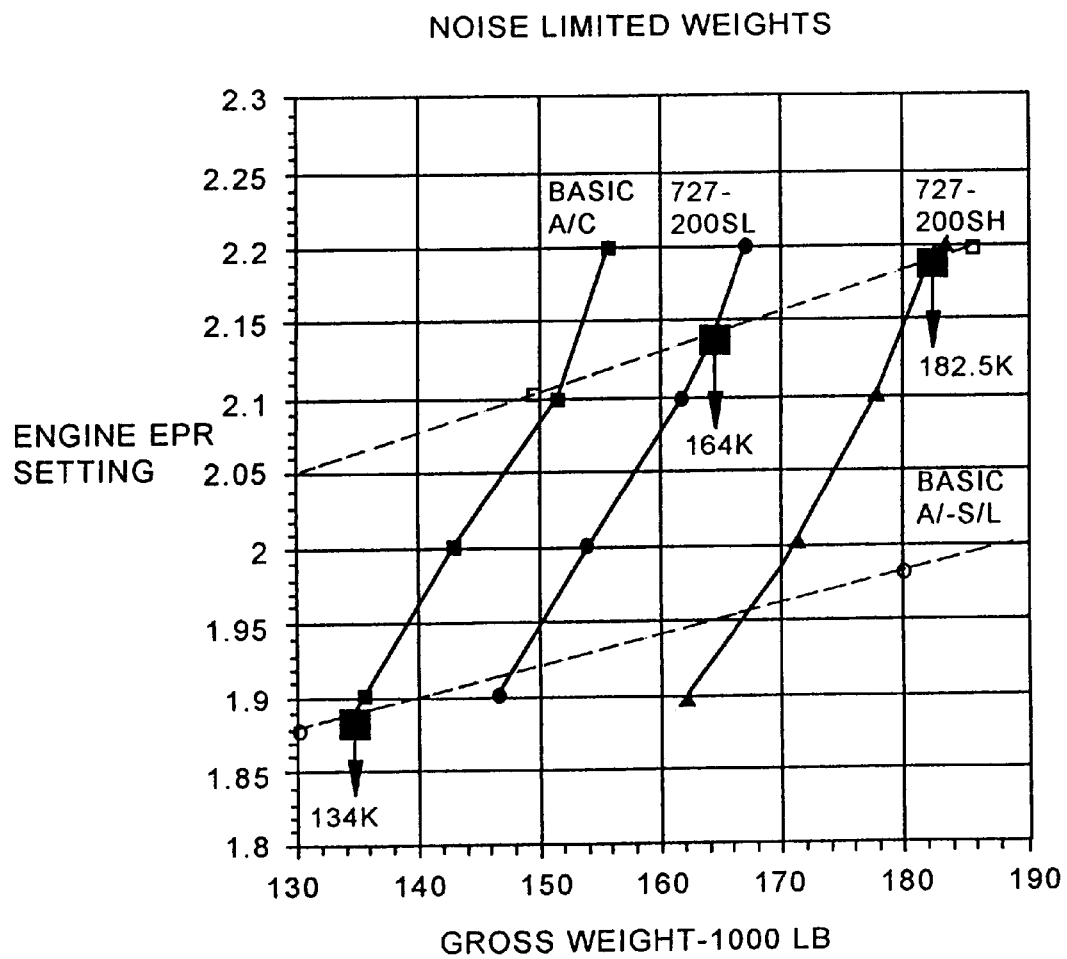
FIG. 17 is an illustration similar to FIG. 12 with the weight tradeoffs illustrating the advantages of the present invention.

FIG. 17 depicts an optimized configuration taking full benefit from the improved aerodynamics, the reduced engine noise and the optimized operational procedures. The aircraft, thus modified, can meet the stage 3 requirements at weights of 162,000 pounds to 184,000 pounds for respectively the light and heavy configuration with and without the inlet guide vane changes respectively.

Table 18 illustrates a summary of the certification noise values for the three principal configurations.

Thus, as can be seen, the unique combination of known physical modifications to the aircraft and its engine in combination with a careful analysis of the flight characteristics of the modified airplane allows the takeoff and landing procedure to be modified, assuring compliance with the FAA noise requirements.

What is claimed is:

1. A method of reducing takeoff drag and increasing altitude over a noise-monitoring station on a departure path for an aircraft, said aircraft having wings, each wing having slats, flaps and ailerons, said method comprising:
    a. modifying said wings of said aircraft, said modification process comprising the steps of:
        1. removing an existing wing tip from an outboard end of each airplane wing;
        2. mounting a winglet to the outboard end of each wing;
        3. re-rigging said flaps and ailerons downwardly for each airplane wing; and
        4. re-rigging said slats on each airplane wing to a reduced deflection for take-off flat settings;
    b. re-calculating stall speeds for the modified wing;
    c. setting reduced flap deflections based upon said re-calculated stall speeds; and
    d. upon takeoff, flying a speed profile based upon said re-calculated stall speeds,
    whereby the re-calculated stall speeds for the modified wing are lower than the stall speeds for an unmodified wing, the lower stall speeds permit the same lift to be generated at a lesser flap deflection resulting in reduced drag during a take-off roll and a steeper climb angle resulting in greater altitude over said noise monitoring station on the departure path.

2. The method according to claim 1, wherein said aircraft is a 727-type aircraft, and each of said aircraft wings has inboard and outboard flaps and inboard and outboard ailerons.

3. The method according to claim 2, wherein said mounting step comprises mounting a winglet having a height of about five feet, an outward cant of about 15° and a sweep of about 50°, said flap re-rigging step comprises re-rigging said inboard and outboard flaps downwardly about 7° and 3.5°, respectively, said aileron re-rigging step comprises re-rigging said inboard and outboard ailerons downwardly about 2° and 1°, respectively, and said re-rigging of said slats comprises a slat setting of about 30° for an aircraft flap setting of about 5°.

4. A method of reducing takeoff drag and increasing altitude over a noise-monitoring station on a departure path for an aircraft, said aircraft having wings, said wings having flaps and ailerons, said method comprising:
    a. modifying said wings of said aircraft, said modification process comprising the steps of:
        1. removing an existing wing tip from an outboard end of each airplane wing;
        2. mounting a winglet to the outboard end of each wing; and
        3. re-rigging said flaps and ailerons downwardly for each airplane wing;
    b. re-calculating stall speeds for the modified wing;
    c. setting reduced flap deflections based upon said re-calculated stall speeds; and
    d. upon takeoff, flying a speed profile based upon said re-calculated stall speeds,
    whereby the re-calculated stall speeds for the modified wing are lower than the stall speeds for an unmodified wing, the lower stall speeds permit the same lift to be generated at a lesser flap deflection resulting in reduced drag during a take-off roll and a steeper climb angle resulting in greater altitude over said noise monitoring station on the departure path.

5. The method according to claim 4, wherein said aircraft is a Boeing 727 aircraft, and each of said aircraft wings has inboard and outboard flaps and inboard and outboard ailerons.

6. The method according to claim 5, wherein said mounting step comprises mounting a winglet having a height of about five feet, an outward cant of about 15° and a sweep of about 50°, said flap re-rigging step comprises re-rigging said inboard and outboard flaps downwardly about 7° and 3.5°, respectively, and said aileron re-rigging step comprises re-rigging said inboard and outboard ailerons downwardly about 2° and 1°, respectively.

7. A method of reducing takeoff drag and increasing altitude over a noise-monitoring station on a departure path for an aircraft, said aircraft having wings, said wings having slats, flaps and ailerons, said method comprising:
    a. modifying said wings of said aircraft, said modification process comprising the steps of:
        1. re-rigging said flaps and ailerons downwardly for each airplane wing; and
        2. re-rigging said slats on each airplane wing to a reduced deflection for take-off flap settings;
    b. re-calculating stall speeds for the modified wing;
    c. setting reduced flap deflections based upon said re-calculated stall speeds; and
    d. upon takeoff, flying a speed profile based upon said re-calculated stall speeds,
    whereby the re-calculated stall speeds for the modified wing are lower than the stall speeds for an unmodified wing, the lower stall speeds permit the same lift to be generated at a lesser flap deflection resulting in reduced drag during a take-off roll and a steeper climb angle resulting in greater altitude over said noise monitoring station on the departure path.

8. The method according to claim 7, wherein said aircraft is a Boeing 727 aircraft, and each of said aircraft wings has inboard and outboard flaps and inboard and outboard ailerons.

9. The method according to claim 8, wherein said flap re-rigging step comprises re-rigging said inboard and outboard flaps downwardly about 7° and 3.5°, respectively, said aileron re-rigging step comprises re-rigging said inboard and outboard ailerons downwardly about 2° and 1°, respectively, and said re-rigging of said slats comprises a slat setting of about 30° for an aircraft flap setting of about 5°.

10. A method of reducing takeoff drag and increasing altitude over a noise-monitoring station on a departure path for an aircraft, said aircraft having wings, said wings having flaps and ailerons, said method comprising:

a. modifying said wings of said aircraft, said modification process comprising the step of re-rigging said flaps and ailerons downwardly for each said aircraft wing;
   b. re-calculating stall speeds for the modified wing;
   c. setting reduced flap deflections based upon said re-calculated stall speeds; and
   d. upon takeoff, flying a speed profile based upon said re-calculated stall speeds,
   whereby the re-calculated stall speeds for the modified wing are lower than the stall speeds for an unmodified wing, the lower stall speeds permit the same lift to be generated at a lesser flap deflection resulting in reduced drag during a take-off roll and a steeper climb angle resulting in greater altitude over said noise monitoring station on the departure path.

11. The method according to claim 10, wherein said aircraft is a 727-type aircraft, and each of said aircraft wings has inboard and outboard flaps and inboard and outboard ailerons.

12. The method according to claim 11, wherein said flap re-rigging step comprises re-rigging said inboard and outboard flaps downwardly about 7° and 3.5°, respectively, and said aileron re-rigging step comprises re-rigging said inboard and outboard ailerons downwardly about 2° and 1° respectively.

13. An aircraft modification for reducing takeoff drag and increasing altitude over a noise-monitoring station on a departure path for an aircraft, said aircraft having wings, each wing having slats, flaps and ailerons, said modification comprising a modified wing, said modified wing having:

at least one winglet mounted on an outboard end of each wing;
   said flaps and ailerons re-rigged downwardly for each airplane wing; and
   said slats re-rigged to a reduced deflection for take-off settings;
   whereby lower stall speeds are re-calculated for the modified wing, take-off flap settings are reduced based upon said re-calculated stall speeds and a take-off speed profile based upon said re-calculated stall speeds is flown resulting in reduced drag during take-off roll and a steeper climb angle resulting in greater altitude over the noise monitoring station on the departure path.

14. The aircraft modification according to claim 13, wherein said aircraft is a Boeing 727 aircraft, and each of said aircraft wings has inboard and outboard flaps and inboard and outboard ailerons.

15. The aircraft modification according to claim 14, wherein said winglet has a height of about five feet, an outward cant of about 15° and a sweep of about 50°, said inboard and outboard flaps are re-rigged downwardly about 7° and 3.5°, respectively, said inboard and outboard ailerons are re-rigged downwardly about 2° and 1°, respectively, and said slats have a slat setting of about 30° for an aircraft flap setting of about 5°.

16. An aircraft modification for reducing takeoff drag and increasing altitude over a noise-monitoring station on a departure path for an aircraft, said aircraft having wings, each wing having flaps and ailerons, said modification comprising a modified wing, said modified wing having:

at least one winglet mounted on the outboard end of each wing; and said
   flaps and ailerons re-rigged downwardly for each wing;
   whereby lower stall speeds are re-calculated for the modified wing, take-off flap settings are reduced based upon said re-calculated stall speeds and a take-off speed profile based upon said re-calculated stall speeds is flown resulting in reduced drag during take-off roll and a steeper climb angle resulting in greater altitude over the noise monitoring station on the departure path.

17. The aircraft modification according to claim 16, wherein said aircraft is a Boeing 727 aircraft, and each of said aircraft wings has inboard and outboard flaps and inboard and outboard ailerons.

18. The aircraft modification according to claim 17, wherein said winglet has a height of about five feet, an outward cant of about 15° and a sweep of about 50°, said inboard and outboard flaps are re-rigged downwardly about 7° and 3.5°, respectively, said inboard and outboard ailerons are re-rigged downwardly about 2° and 1°, respectively.

19. An aircraft modification for reducing takeoff drag and increasing altitude over a noise-monitoring station on a departure path for an aircraft, said aircraft having wings, each wing having slats, flaps and ailerons, said modification comprising a modified wing, said wing having:

said flaps and ailerons re-rigged downwardly for each airplane wing; and
   said slats re-rigged to a reduced deflection for take-off settings;
   whereby lower stall speeds are re-calculated for the modified wing, take-off flap settings are reduced based upon said re-calculated stall speeds and a take-off speed profile based upon said re-calculated stall speeds is flown resulting in reduced drag during take-off roll and a steeper climb angle resulting in greater altitude over the noise monitoring station on the departure path.

20. The aircraft modification according to claim 19, wherein said aircraft is a Boeing 727 aircraft, and each of said aircraft wings has inboard and outboard flaps and inboard and outboard ailerons.

21. The aircraft modification according to claim 20, wherein said inboard and outboard flaps are re-rigged downwardly about 7° and 3.5°, respectively, said inboard and outboard ailerons are re-rigged downwardly about 2° and 1°, respectively, and said slats have a slat setting of about 30° for an aircraft flap setting of about 5°.

22. An aircraft modification for reducing takeoff drag and increasing altitude over a noise-monitoring station on a departure path for an aircraft said aircraft having wings, each wing having flaps and ailerons, said modification comprising a modified wing, said wing modified having;

said flaps and ailerons re-rigged downwardly for each airplane wing;
   whereby lower stall speeds are re-calculated for the modified wing, take-off flap settings are reduced based upon said re-calculated stall speeds and a take-off speed profile based upon said re-calculated stall speeds is flown resulting in reduced drag during take-off roll and a steeper climb angle resulting in greater altitude over said noise monitoring station on the departure path.

23. The aircraft modification according to claim 22, wherein said aircraft is a Boeing 727 aircraft, and each of said aircraft wings has inboard and outboard flaps and inboard and outboard ailerons.

24. The aircraft modification according to claim 23, wherein said inboard and outboard flaps are re-rigged downwardly about 7° and 3.5°, respectively, said inboard and outboard ailerons are re-rigged downwardly about 2° and 1°, respectively.

* * * * *